United States Patent [19]

Dotson

[11] 4,331,427
[45] May 25, 1982

[54] EDUCATIONAL TIME TEACHING DEVICE

[76] Inventor: Dale A. Dotson, 1005 Mantooth, Lufkin, Tex. 75901

[21] Appl. No.: 205,176

[22] Filed: Nov. 10, 1980

[51] Int. Cl.³ .................................. G09B 19/12
[52] U.S. Cl. ............................ 434/304; 434/110
[58] Field of Search .......................... 434/304, 110

[56] References Cited

U.S. PATENT DOCUMENTS

| | | | |
|---|---|---|---|
| 1,356,929 | 10/1920 | Lewers | 434/304 |
| 1,688,766 | 10/1928 | Vincent | 46/175 R X |
| 2,172,450 | 9/1939 | Pitcher | 434/304 |
| 2,635,357 | 4/1953 | Whitlock | 434/304 |
| 3,034,229 | 5/1962 | Kessler | 434/304 |
| 3,131,489 | 5/1964 | Alpert | 434/304 |
| 3,149,423 | 9/1964 | Naples | 434/304 |
| 3,488,864 | 1/1970 | McManus | 434/110 |
| 3,670,428 | 6/1972 | Hall | 434/304 |
| 3,829,989 | 8/1974 | Pecoraro | 434/304 |

Primary Examiner—William H. Grieb
Attorney, Agent, or Firm—Richards, Harris & Medlock

[57] ABSTRACT

An educational time teaching device especially useful for teaching children to tell time is disclosed. A base member has a plurality of coins mounted on it, the coins defining a minute scale from five to sixty in five minute intervals thereon, based upon the value of the coins. A dial member has an hour scale on it and can be detachably mounted in angularly aligned superposed relationship with the minute scale on the base member. An hour hand is provided and may be pivotably and detachably mounted on the base member alone or on the dial member when it is in angularly aligned superposed relationship with the base member.

9 Claims, 4 Drawing Figures

EDUCATIONAL TIME TEACHING DEVICE

TECHNICAL FIELD

This invention relates to educational time teaching devices, and more particularly, to improved structure for teaching children to tell time.

BACKGROUND ART

A variety of patents pertaining to toy clocks or aids for teaching children to tell time are known. Typically, these devices consist of one or more dials with numbers thereon to reflect hours and minutes. These include U.S. Pat. Nos. 1,688,766; 2,172,450; 2,635,357; 3,034,229; 3,149,423; and 3,670,428. The problem with these prior art disclosures is that each uses numerals as the structural basis for attempting to teach children to recognize and understand the concepts of minutes and hours. Many children experience difficulty in absorbing these somewhat confusing concepts.

DISCLOSURE OF THE INVENTION

The present invention provides an improved time teaching device based upon the heretofore unrecognized fact in the time teaching art that children early come to understand and appreciate the concept of coin money. The present invention thus incorporates both coin money and numerals into a time teaching device, in an efficacious and synergistic fashion.

In accordance with one embodiment of the present invention, an educational time teaching device includes a first, minute dial having a plurality of coins operatively positioned to define a minute scale in five unit intervals from five to sixty, based upon value of the coins. A second, hour dial can be detachably mounted on the first dial in angularly aligned coaxially superposed relationship within the periphery of the minute scale. A rotatable hand also is provided, and can be used either with the minute hand alone, or with the two superposed dials. The minute dial is colored in two contrasting colors on either side of an imaginary line extending between thirty cents and sixty cents. The designations "past" and "till" also are used in appropriate fashion on the minute scale. In use, a child is first taught to read the minute hand by demonstration, making use of the hitherto unrecognized early knowledge of money that children appear to possess. Then, the hour and minute dials can be placed into juxtaposition.

DESCRIPTION OF THE DRAWINGS

A more complete understanding of the present invention may be had by reference to the following detailed description when taken in conjunction with the drawings wherein.

DETAILED DESCRIPTION

Figure 1:
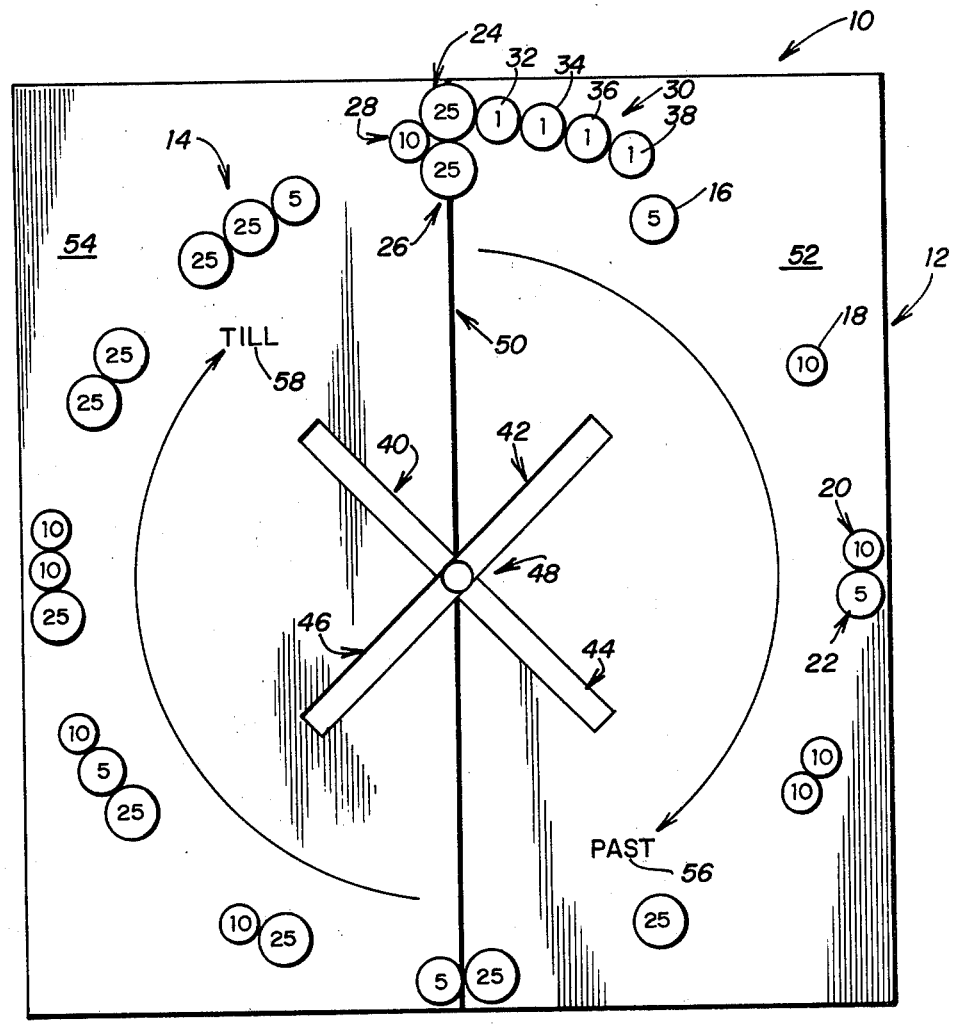
FIG. 1 is a front view of the minute dial of the present invention.

In FIG. 1, the minute dial designated generally by 10 is formed with a base 12 upon which are mounted a plurality of coins 14. The coins 14 are positioned on base 12 at locations corresponding to five minute intervals on the minute dial and define a circle having a first diameter, the coins being U.S. coins having a minimum value of $0.05 and at least one such coin being operatively positioned at each such location, such that the total value of such coins at each such location corresponds to the number of minutes at each such five minute interval. Thus, a nickle 16 is positioned at the location corresponding to five minutes past the hour and dime 18 is positioned at the location corresponding to 10 minutes past the hour. A dime 20 and a nickle 22 are positioned adjacent to one another at the location corresponding to 15 minutes past the hour. This positioning of coins at locations corresponding to 5 minute intervals about the minutedial continues all around the dial until the hour. Quarters 24 and 26 and dime 28 are positioned at the location corresponding to the hour. There are, of course, a number of coin combinations that may be used at locations between five minutes past the hour and the hour. Any of such combinations is acceptable, as long as the coins total the monetary amount of cents corresponding to the number of minutes at each such location.

In addition to the coins 14 which are utilized at 5 minute intervals about the minute dial, a plurality of pennies 30 may also be positioned on the base 12. Four pennies, as shown by 32, 34, 36 and 38 are positioned at locations corresponding to each of the minutes between the five unit interval on the minute dial between the hour and five minutes past the hour. Additional pennies may be positioned at appropriate locations about the minute dial, at the locations between each of the five minute intervals.

Notches or grooves 40, 42, 44 and 46 are provided in the base 12 and function in a manner that will become apparent hereinbelow. An aperture 48 is designed to receive a screw or other pivot, for purposes which also will become apparent hereinbelow. A dividing line 50 divides the dial 10 into two even segments 52 and 54 by passing through the hour and half-hour positions. The segments 52 and 54 preferably are colored with any two contrasting colors, such as blue and gold, respectively. In addition to the color scheme, the word "past" as indicated by 56 is printed on the periphery of the right hand segment 52 and the word "till" as indicated by 58 is printed on the periphery of the left hand segment 54, or in any other suitable location, to indicate minutes after and to the hour.

Figure 2:
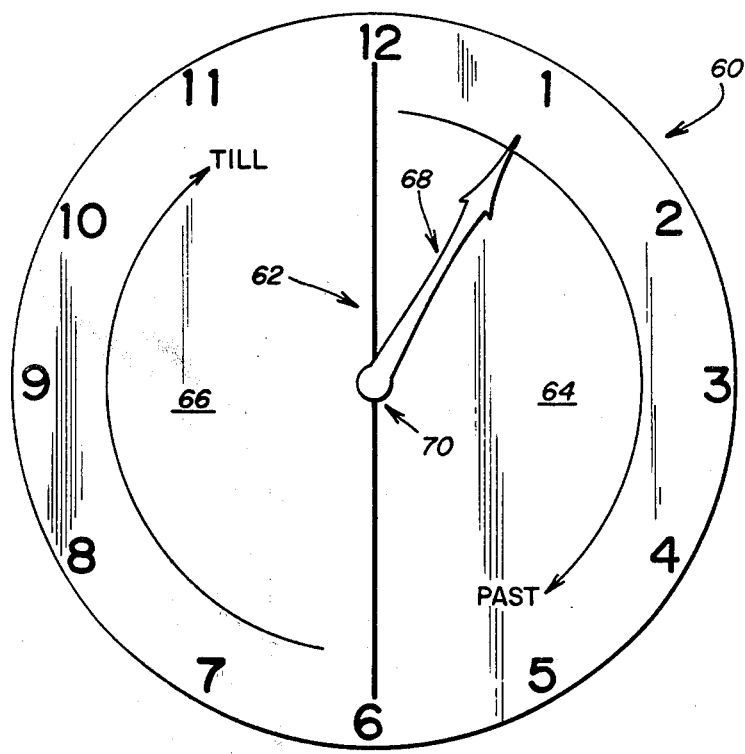
FIG. 2 is a front view of the hand and hour dial of the present invention.

Referring now to FIG. 2, hour dial 60 is shown. The hour dial consists of a conventional sequence of numbers ranging from 1 to 12. The hour dial is divided into two equal parts by a diameter line 62 passing through the "12" and "6" on the hour dial. The diameter line 62 divides the hour dial 60 into two equal segments 64 and 66, which may be colored in any contrasting colors, but which preferably are the same colors as those used to color segments 52 and 54 in FIG. 1. In addition, segment 64 has the word "past" and segment 66 has the word "till". A hand 68 is shown pivotally mounted on hour dial 60 by means of a screw 70. In actual operation, screw 70 is affixed in base 12 via aperture 48.

Figure 3:
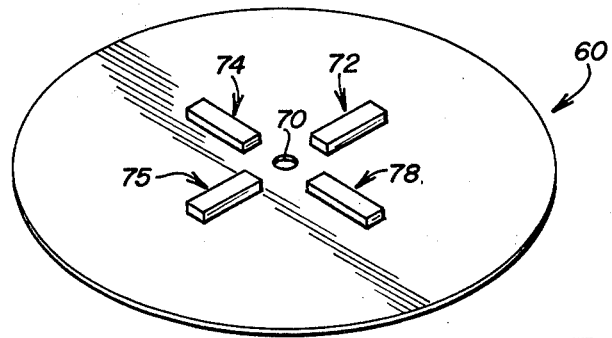
FIG. 3 is a bottom view of the hour dial shown in FIG. 2.

Referring now to FIG. 3, a bottom view of the hour dial FIG. 2 is shown. Tongues 72, 74, 75 and 78 extend from the bottom of the hour dial as shown and coact with grooves 40, 42, 44 and 46 to allow hour dial 60 to be detachably but fixedly mounted on minute dial 10. The hour dial 60 has a diameter which is less than the first diameter defined by the coins 14 on the base 12. In this way, hour dial 60 can be mounted on minute dial 10 without obscuring the view of coins 14 and 30.

Figure 4:
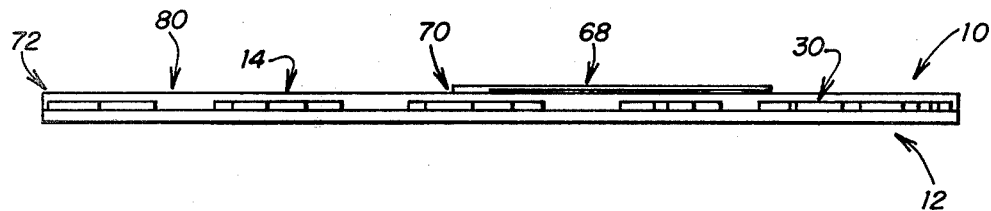
FIG. 4 is a side view of the invention with the minute dial shown in FIG. 1 and the hand and hour dial shown in FIG. 3 in juxtaposition.

FIG. 4 is a side view of the device of FIG. 1 and shows hand 68 pivotally mounted by means of screw 70 to the base 12. Coins 14 and 30 are shown fixedly mounted on base 12 by means of a transparent sealing material such as a transparent plastic, as shown by 80.

In operation, hand 68 is mounted by means of screw 70 on minute dial 10. Children have been found readily to grasp the concept of minutes when coins, and particularly U.S. coins, are used as the instructional medium. Once the children have mastered the concept of minutes using this device of FIG. 4, hand 68 is detached, hour dial 60 is mounted on minute dial 10 by means of the tongues and grooves heretofore described, and the hand 68 is remounted by means of screw 70. This allows children to visualize the relationship between numerals of an hour dial and the number of minutes.

The improved educational device described herein has significant advantages over prior art devices, which all fail to recognize or appreciate the possibility of using coins as a time teaching mechanism. Although particular embodiments of the invention have been illustrated in the drawings and described herein, it will be understood that the invention is not limited to the embodiment disclosed, but is capable of rearrangement, modification and substitution of parts and elements without departing from the spirit of the invention.

I claim:
1. An educational time teaching device, comprising:
   (a) a base member;
   (b) a plurality of coins mounted on said base member and defining a minute scale from five to sixty in five unit intervals thereon, based upon the value of said coins, said minute scale defining a first diameter;
   (c) a dial member having an hour scale and defining a second diameter smaller than said first diameter;
   (d) first means operatively positioned for detachably mounting said dial member in angularly aligned superposed relationship with said minute scale on said base member;
   (e) an hour hand; and
   (f) second means operatively positioned for pivotally and detachably mounting said hour hand at least on said base member.
2. The device of claim 1 wherein said coins are United States coins.
3. The device of claim 2, further comprising a plurality of United States pennies mounted on said base member and defining minutes in the five unit intervals defined by said plurality of coins.
4. The device of claim 3 wherein said coins and said pennies are mounted on said base member by transparent mounting means.
5. The device of claim 4 wherein said base member defines a diameter line along said minute scale and intersecting the sixty minutes position and the thirty minutes, thereby defining first left and right hand portions, said first left hand portion being of a first color and said first right hand portion being of a second color.
6. The device of claim 5 wherein said dial member defines a diameter line passing along said hour scale and intersecting the six o'clock position and the twelve o'clock position, thereby defining second left and right hand portions, said second left hand portion being of a third color and said second right hand portion being of a fourth color.
7. The device of claim 6 wherein said first color and said third color are the same and wherein said second color and said fourth color are the same.
8. The device of claim 7 wherein said first means is comprised of a plurality of tongues extending from said dial member and a plurality of grooves defined in said base member.
9. The device of claim 8 wherein said second means is comprised of a screw mounted in said base member.

* * * * *